United States Patent
Pereira Lemos (10) Patent No.: US 11,491,838 B2
(45) Date of Patent: Nov. 8, 2022

(54) SUSPENSION FOR A VEHICLE

(71) Applicant: IVECO S.p.A., Turin (IT)

(72) Inventor: Jose Francivaldo Pereira Lemos, Sete Lagoas MG (BR)

(73) Assignee: IVECO S.P.A., Turin (IT)

(*) Notice: Subject to any disclaimer, the term of this patent is extended or adjusted under 35 U.S.C. 154(b) by 0 days.

(21) Appl. No.: 17/257,629

(22) PCT Filed: Jul. 10, 2019

(86) PCT No.: PCT/IB2019/055878
§ 371 (c)(1),
(2) Date: Jan. 4, 2021

(87) PCT Pub. No.: WO2020/012377
PCT Pub. Date: Jan. 16, 2020

(65) Prior Publication Data
US 2021/0291605 A1    Sep. 23, 2021

(30) Foreign Application Priority Data

Jul. 10, 2018    (IT) .................. 102018000007078

(51) Int. Cl.
*B60G 15/06*    (2006.01)
*B60G 15/12*    (2006.01)
*B60G 21/055*    (2006.01)

(52) U.S. Cl.
CPC .......... *B60G 15/067* (2013.01); *B60G 15/12* (2013.01); *B60G 21/0551* (2013.01); *B60G 2202/112* (2013.01); *B60G 2202/135* (2013.01); *B60G 2202/152* (2013.01); *B60G 2202/24* (2013.01); *B60G 2204/121* (2013.01); *B60G 2204/126* (2013.01); *B60G 2204/129* (2013.01); *B60G 2204/1224* (2013.01); *B60G 2204/422* (2013.01); *B60G 2204/4306* (2013.01);
(Continued)

(58) Field of Classification Search
CPC ........ B60G 2200/315; B60G 2200/344; B60G 2200/343; B60G 15/067
See application file for complete search history.

(56) References Cited

U.S. PATENT DOCUMENTS 5,346,247 A    9/1994    Snyder
5,564,521 A *  10/1996   McLaughlin ............ B60G 9/00
                                                    180/352
(Continued)

FOREIGN PATENT DOCUMENTS

AU    2009200960 A1 *  4/2009    ............. B60G 11/27
CN        1535218 A *  10/2004    ............. B60G 7/001
(Continued)

*Primary Examiner* — Paul N Dickson
*Assistant Examiner* — Maxwell L Meshaka
(74) *Attorney, Agent, or Firm* — Leason Ellis LLP (57) ABSTRACT

A suspension system for a rear axle of a vehicle provided with a frame equipped with at least two side members, the suspension system connecting the axle to said side members and comprising a left side and a right side, each comprising an axle-holder assembly, a bellows, a leaf spring, first and second bars, and a torsion bar interposed between said left and right sides. The aforementioned elements of the suspension system being arranged to provide a functional layout having reduced costs and overall dimensions.

15 Claims, 5 Drawing Sheets

(52) U.S. Cl.
CPC .. *B60G 2204/4307* (2013.01); *B60G 2204/61* (2013.01); *B60G 2300/026* (2013.01)

(56) References Cited

U.S. PATENT DOCUMENTS

| | | | |
|---|---|---|---|
| 6,390,485 B1 | 5/2002 | Cadden | |
| 6,604,734 B1 * | 8/2003 | Griffiths | B60G 17/0521 267/64.19 |
| 7,017,888 B2 * | 3/2006 | Platner | F16F 1/3683 267/27 |
| 7,077,413 B2 * | 7/2006 | Svartz | B60G 9/003 280/124.164 |
| 7,104,561 B1 * | 9/2006 | Griffiths | B60G 11/27 280/124.157 |
| 7,195,272 B2 * | 3/2007 | Larson | B60G 5/00 267/52 |
| 9,242,524 B2 * | 1/2016 | Dudding | B60G 11/27 |
| 2002/0117816 A1 * | 8/2002 | Dudding | B60G 9/00 280/6.151 |
| 2004/0056446 A1 * | 3/2004 | Dudding | B60G 11/64 280/124.128 |
| 2005/0161896 A1 * | 7/2005 | Reineck | B60G 9/022 280/124.128 |
| 2021/0162873 A1 * | 6/2021 | Yu | B60K 1/00 |
| 2022/0032713 A1 * | 2/2022 | Ghirardi | B60G 15/062 |

FOREIGN PATENT DOCUMENTS

| | | | | |
|---|---|---|---|---|
| EP | 1380449 A2 * | 1/2004 | ......... | B60G 21/0551 |
| EP | 1380450 A2 * | 1/2004 | ............ | B60G 11/27 |
| JP | S57 90205 | 6/1982 | | |
| JP | H05 63913 | 3/1993 | | |
| WO | WO 2010/077186 | 7/2010 | | |

\* cited by examiner

SUSPENSION FOR A VEHICLE

CROSS-REFERENCE TO RELATED APPLICATIONS

This patent application is a U.S. National Phase Application under 35 U.S.C. § 371 of International Patent Application No. PCT/IB2019/055878, filed on Jul. 10, 2019, which claims priority from Italian patent application no. 102018000007078 filed on Jul. 10, 2018, all of which are incorporated by reference, as if expressly set forth in their respective entireties herein.

TECHNICAL FIELD

The invention relates to a suspension for a vehicle, more in particular to a rear suspension for a heavy vehicle, such as for example a truck or a lorry.

KNOWN STATE OF THE ART

Vehicle suspensions comprise an assembly of elements configured to reduce the transmission of vibrations which might be transmitted to the frame of the vehicle by the axle because of the profile of the road surface. The performances of a suspension are given by the ability to reduce the transmission of the aforesaid vibrations relative to the driveability of the vehicle, the costs and the weight of the suspension.

Many types of suspensions for heavy vehicles are known, for example merely mechanical suspensions comprising elements such as torsion or anti-roll bars, Panhard rods, or even "V"-shaped bars or "active" suspensions, such as for example the suspensions known as "full-air" or "air-link" suspensions comprising actuators, such as air springs, and a system of sensors connected to an electronic interface designed to control the actuators so as to make up for the stresses arising between the frame and the axle of the vehicle.

However, the aforesaid solutions are provided with many elements and, as a consequence, take up much space and are heavy; furthermore, the "active" suspensions are particularly expensive and need dedicated wirings for the sensors/actuator elements, which, in turn, take up much space and are heavy.

Furthermore, rear suspensions of any type must be designed taking into account an angle known as "anti-squat" (also referred to as "dive" angle); said angle defines the tendency of the vehicle body, while accelerating, to lower or lift at the front depending on the value assumed by said angle.

Figure 1:
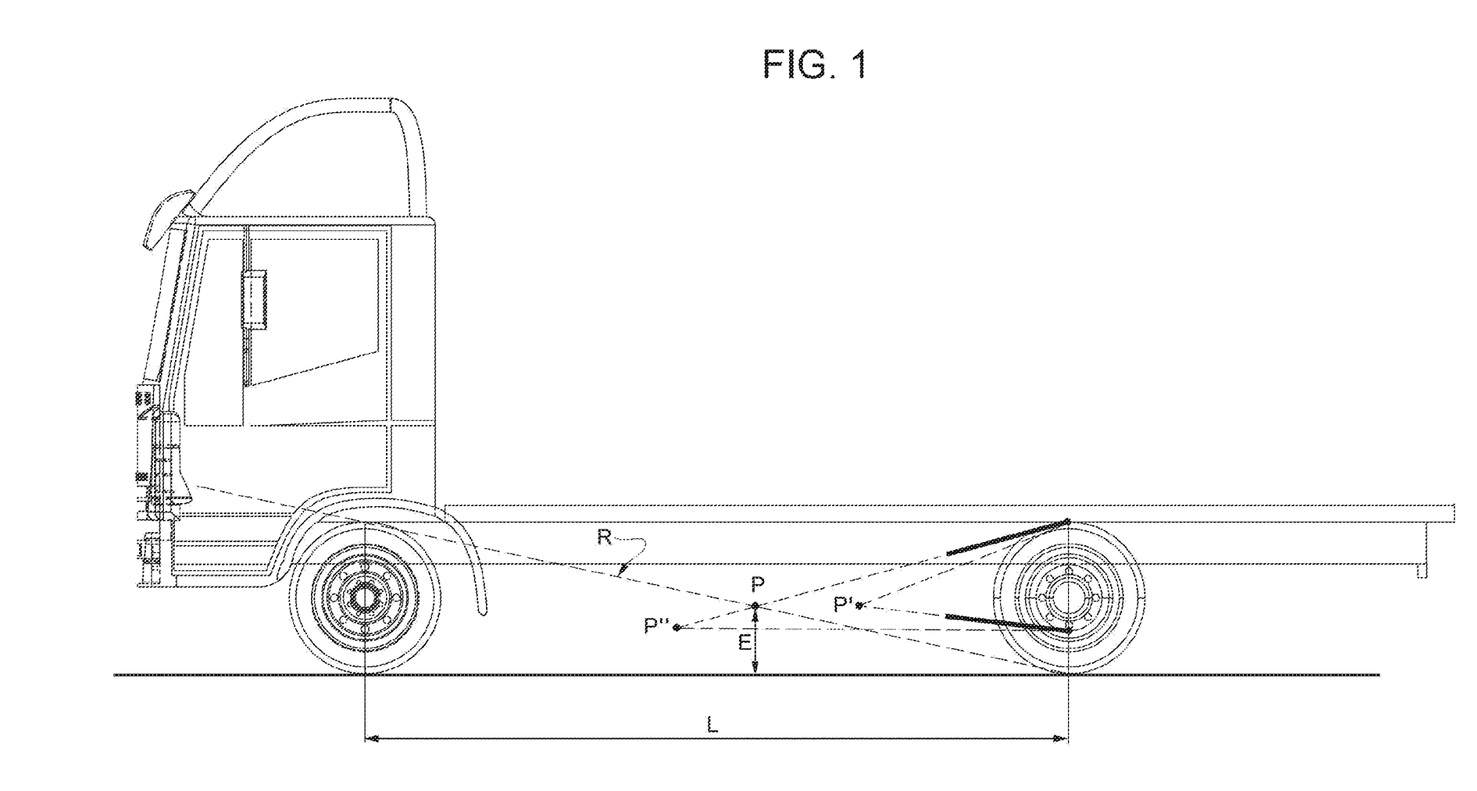
FIG. 1 shows a schematic side view concerning the calculation of the anti-squat angle of a heavy vehicle.

With reference to FIG. 1, the tangent of said angle is equal to the ratio between the height E at which the intersection of the straight lines extending between two connection elements connecting the suspension to the frame of the vehicle is arranged and the horizontal distance D of said intersection from the point of contact of the rear wheel. In case of fixing with a single arm, the point of mounting is the point in which to measure the height E.

According to FIG. 1, said "anti-squat" angle is set at the value of the ratio between the vertical distance H of the drive shaft of the vehicle and the horizontal distance L from the point of contact of the rear wheel along a straight line R ideally connecting the point of contact between the rear wheel of the vehicle and the drive shaft of the vehicle.

Said angle assumes greater values under the aforesaid line (for example in the joining point P'') and smaller values above the aforesaid line (for example in the joining point P'). For a heavy vehicle, it is known that a suspension configuration having an anti-squat angle value exceeding the aforesaid H/L ratio by 50% can feature rearing problems during the acceleration of a vehicle, for example when driving uphill.

Known suspensions have a fixed value of the anti-squat angle which usually is greater than 50%, thus causing problems concerning the lifting of the front part of the vehicle during the acceleration.

Therefore, manufacturers have expressed the need to improve known rear suspensions for heavy vehicles in order to reduce the value of the anti-squat angle below the aforesaid excess 50% relative to the value of the H/L ratio.

Furthermore, there is a need to improve known rear suspensions by reducing the weight and the dimensions thereof and, at the same time, by increasing the shock-absorbing and driving performances thereof.

The object of the invention is to fulfil the needs discussed above in an economic fashion.

SUMMARY OF THE INVENTION

The aforesaid object is reached by a vehicle suspension according to the appended claims.

BRIEF DESCRIPTION OF THE DRAWINGS

The invention will be best understood upon perusal of the following detailed description of a preferred embodiment, which is provided by way of non-limiting example, with reference to the accompanying drawings, wherein.

DETAILED DESCRIPTION OF THE INVENTION

FIG. 1 shows a known vehicle 1 comprising a frame (not shown), which is connected to a plurality of wheels 2, front wheels 2a and rear wheels 2b, which are supported by the frame ad described below.

Said frame comprises, as it is known in the heavy vehicle industry, at least a pair of side members 3, in particular a right side member 3a and a left side member 3b, which are connected to one another by at least a plurality of bars 4, which are perpendicular to the side members 3a, 3b.

Figure 2:
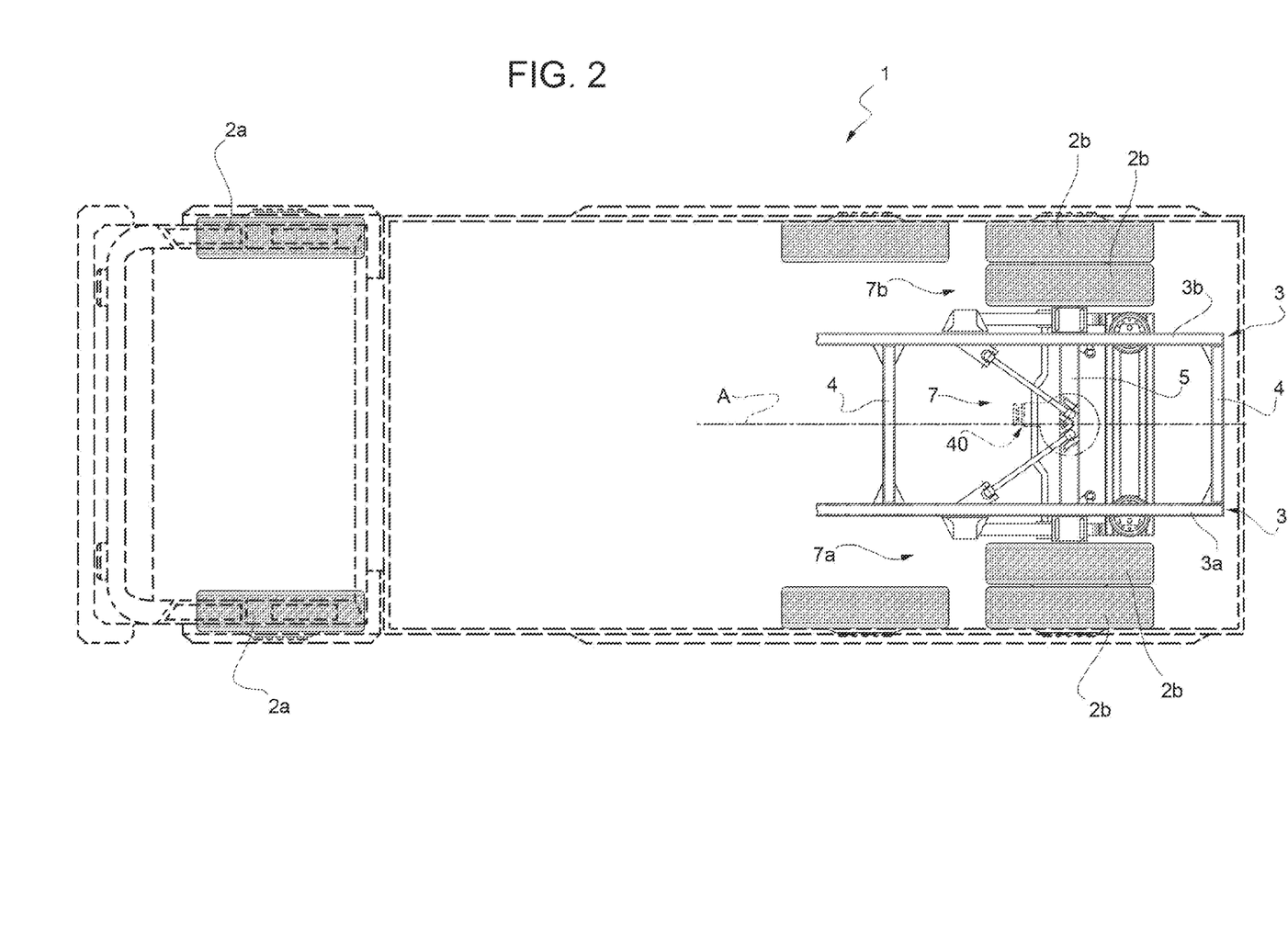
FIG. 2 shows a schematic view from the top of a vehicle comprising a rear suspension according to the invention.
Figure 3:
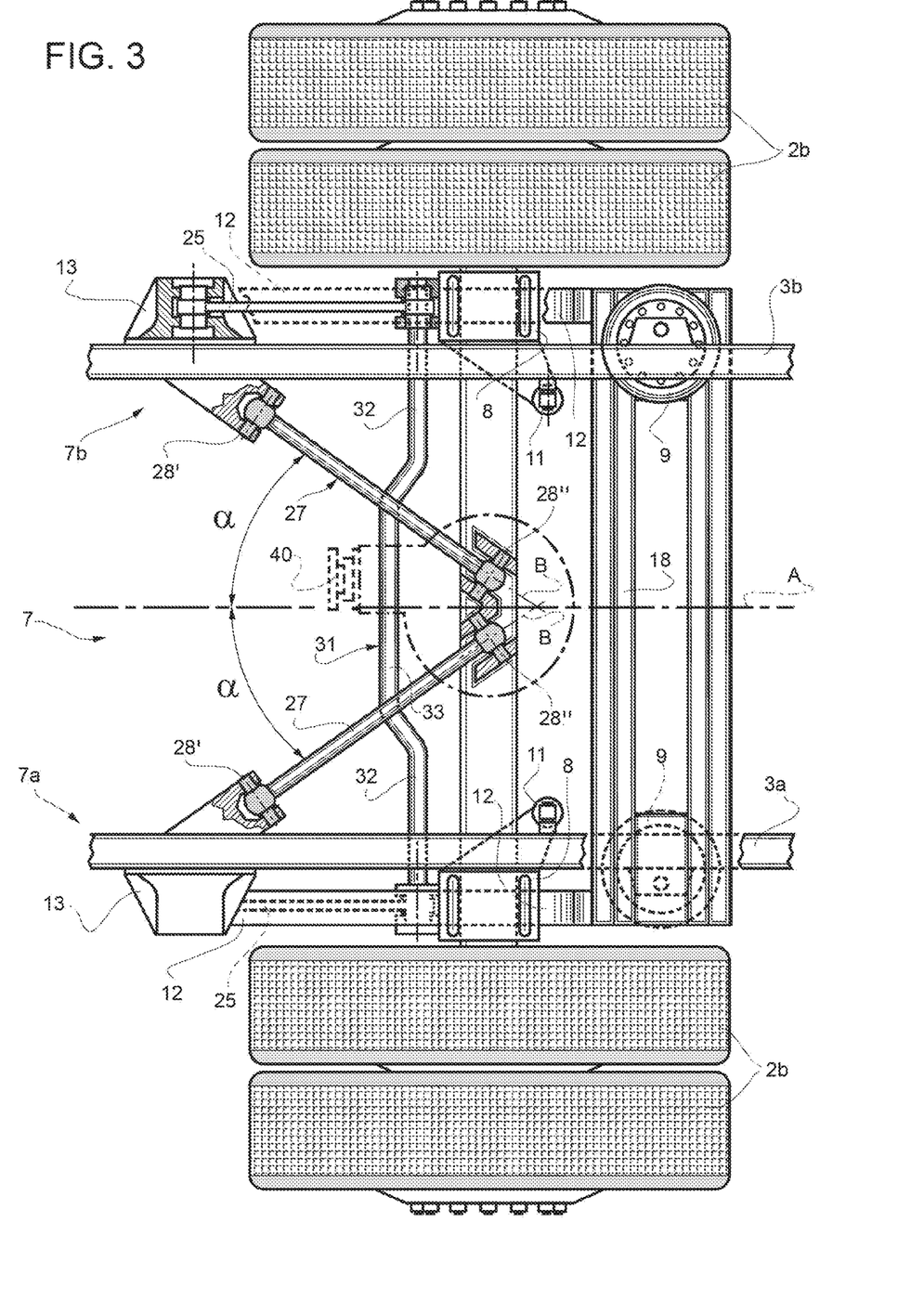
FIG. 3 shows a view from the top, which is enlarged and partially sectional, of the suspension of the vehicle of FIG. 2.

The rear wheels 2b are connected to one another by means of a rear axle 5, which is connected to the frame of the vehicle, i.e. to the side members 3a, 3b, by means of a suspension system 7 according to the invention.

The suspension system 7 comprises a right side 7a and a left side 7b, which are connected to one another as described more in detail hereinafter.

Each one of said right 7a and left 7b sides basically comprises an axle-holder 8, a bellows 9, a shock absorber 11 and a leaf spring 12.

The leaf spring 12, which preferably has a rectangular cross section, comprises a first end 12a connected to a respective side member 3a, 3b, in the example described herein by means of a bracket 13 fixed to the latter, a second end 12b opposite the first end and connected to the bellows 9 and an intermediate portion 12c cooperating in contact with the axle-holder assembly 8.

The bracket 13 is laterally fixed, for example by means of threaded means, to the respective side member 3a, 3b, perpendicularly extends downwards from the latter and comprises an upper portion 13a, which is configured to allow the bracket 13 to be fixed to the respective side member 3a, 3b, a lower portion 13b, which is opposite the portion 13a, and an intermediate portion 13c, which joins the upper and lower portions 13a, 13b. The first end 12a of the leaf spring 12 is preferably connected to the intermediate portion 13c by means of a connection 14.

According to an aspect of the invention, the connection 14 is a mechanical coupling configured to limit at least the horizontal movement of the leaf spring, allowing the latter to rotate around the first end 12a, similarly to a hinge. In the embodiment described herein, the first end 12a comprises a terminal portion 12d with the shape of a hook, which is configured to cooperate with a projection 15, which has a shape that is complementary to the one of the hook of the terminal portion 12d and extends perpendicularly, in a lateral direction, from the intermediate portion 13c of the bracket 13.

The bellows 9 is fixed, at the bottom, to the second end 12b of the leaf spring 12, for example by means of threaded connections, such as for example bolts. The bellow 9 is connected, at the top, to the respective side member 2a, 2b, for example by means of threaded connections, such as for example bolts.

The suspension 7 further comprises a crossbeam 18, which is connected between the bellows 9 and the second end 12b of the leaf spring by means of threaded elements, such as bolts; the crossbeam 18 is preferably manufactured as a section bar body and connects the right and left sides 7a, 7b of the suspension 7, between the respective bellows 9 and the respective leaf springs 12, as described above.

The shock absorber 11, which is preferably manufactured as a hydraulic or pneumatic cylinder, is connected—at a first end—to the respective side member 3a, 3b and—at a second end—to the axle-holder assembly 8, as described below, in a position comprised between the axle 5 and the bellows 9. The connection to the axle-holder assembly 8 and to the side member 3a, 3b is advantageously obtained by means of hinges 19, which are configured to permit a rotation relative to the axle-holder assembly 8 and/or to the side member 3a, 3b of the shock absorber 11

The axle-holder assembly 8 is configured to surround the axle 5 and provide anchoring points for the elements of the suspension 7, as described hereinafter.

According to the embodiment described herein, the axle-holder assembly 8 comprises a plurality of plates 21, in the case described herein a lower plate 21a, an upper plate 21b and an intermediate plate 21c arranged between the lower and upper plates 21a, 21b; the plates 21a, 21b and 21c are vertically interposed between the axle 5 and the leaf spring 12 and are held together by a compression force provided by retention means 22.

For instance, the retention means 22 can comprise a pair of U-shaped arms 23 going through the plates 21a, 21b and 21c and comprising, in the free end portions, a thread, which is designed to cooperate with a nut 24, which is designed to provide the compression force needed to hold the aforesaid elements packed together.

Each one of the right 7a and left 7b sides of the suspension system 7 further comprises a first stabilizing bar 25, also known as "Stabilinker", comprising a first end 25a connected to the bracket 13 and a second end 25b, opposite the first end 25a, connected to the axle-holder assembly 8. The first end 25a and the second end 25b are advantageously connected to the respective elements by means of hinge connections 26.

The hinge connection 26 of the first end 25a is advantageously obtained in the lower portion 13b of the bracket 13, under the connection of the leaf spring 12 to the bracket 13 and preferably collinear with the latter.

The Stabilinker 25 preferably has a rectangular cross section arranged perpendicularly relative to the rectangular cross section of the leaf spring 12 and is connected to the bracket 13 and to the axle-holder assembly 8 so as to define an inclination angle β relative to a horizontal axis and variable depending on the distance between axis, centre of mass and anti-squat angle pre-set for the vehicle.

Each one of the right 7a and left 7b sides of the suspension system 7 further comprises a second stabilizing bar 27, or "V-shaped bar", comprising a first end 27a connected to the bracket 13 by means of a connection 28' and a second end 27b, opposite the first end 27a, connected to the axle 5 by means of a connection 28".

In particular, the V-shaped bars 27 of the right 7a and left 7b sides have respective longitudinal axes B, which are inclined relative to a longitudinal axis A of the vehicle, relative to a horizontal plane parallel to the ground plane. Said inclination advantageously defines an angle α, preferably the same between each V-shaped bar 27 and the axis A, with a value that is pre-set based on the type of vehicle.

The connections 28', 28" advantageously are hinge connections and each V-shaped bar 27 is fixed to the bracket 13 and to the axle 5 so as to define an inclination angle γ, which is variable depending on the distance between axis, centre of mass and anti-squat angle pre-set for the vehicle.

According to an aspect of the invention, at least one of the connections 26, 28 is adjustable in height and/or horizontally, in order to vary the respective inclination angle β, γ relative to the horizontal. In the case described herein, the connection 28" is configured to allow the height thereof to be adjusted relative to the point of contact between the wheel 2b and the ground, so as to change the inclination angle γ of the V-shaped bar accordingly.

For instance, the adjustment of the connection 28" is carried out by means of a vertically sliding prism coupling of the portion 28b to the axle 5. Said prism coupling can be obtained, for example, by means of a groove (not shown), which is configured to house, in a sliding manner, a portion, with a complementary shape, carried by the portions 28b. After the pre-set height has been adjusted, the portion 28b is fixed by means of threaded means, such as bolts.

The suspension 7 further comprises a torsion bar 31, which is connected to the axle-holder assembly 8 and is configured to generate a torsional resistance when the side members 3a, 3b tend to relatively move in a vertical direction.

The torsion bar 31 advantageously comprises a pair of end portions 32, which are connected, at an end, to the axle-holder assembly 8 and are connected to a U-shaped central portion 33, preferably arranged with the opening towards the axle 5. The torsion bar 31 advantageously has a symmetrical shape relative to the axis A and the end portions 32 and the central portion 33 are manufactured as one single piece.

The end portions 32 are advantageously connected to the axle-holder assembly 8 in the same connection point as the second portions of the Stabilinkers 25 and the hinge 26 of the second portions 25b is preferably obtained around the end portions 32.

Figure 4:
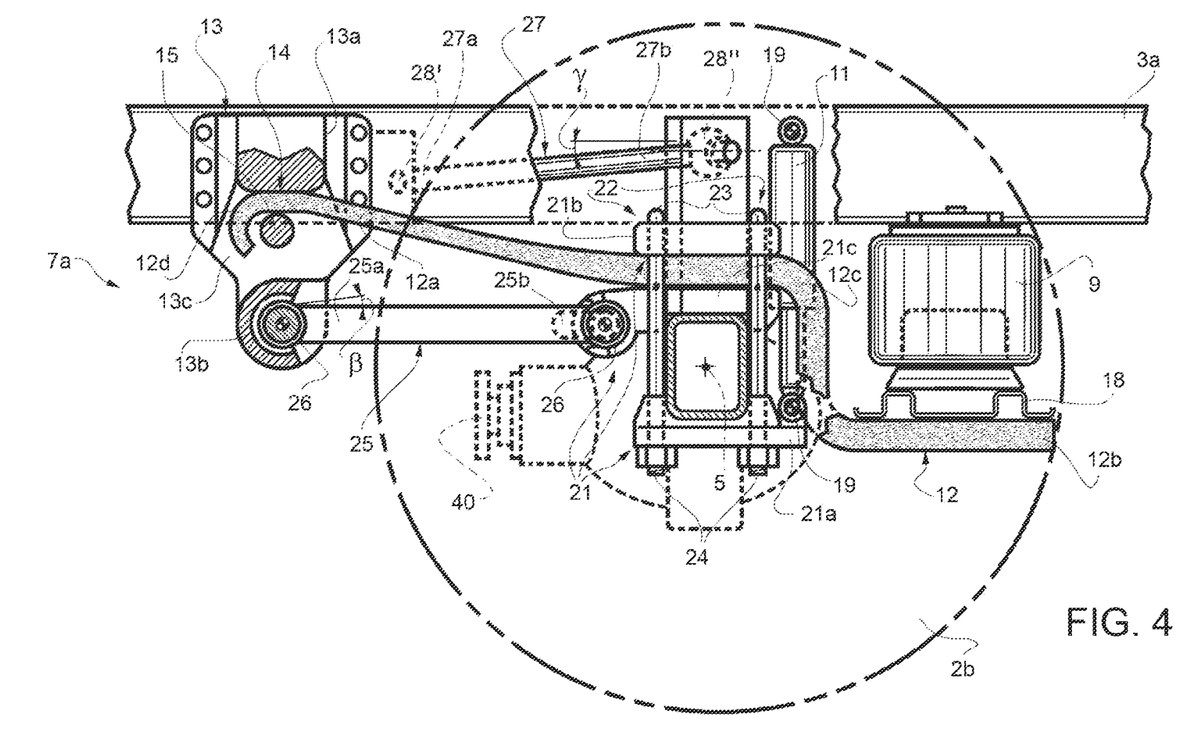
FIG. 4 shows a partially sectional side view of a first embodiment of the suspension of the vehicle of FIG. 2.

According to the embodiment shown in FIG. 4, the torsion bar 31 is arranged above the axle 5, in particular above a differential 40 of the vehicle 1.

In this configuration, the plates 21a, 21b, 21c are arranged so that the leaf spring 12 is comprised between the upper plate 21c and the intermediate plate 21b and the torsion bar 31 and, consequently, the Stabilinker 25 are fixed to the intermediate plate 21b. The intermediate plate 21b is placed above the axle 5 and the lower plate 21a acts like a hinge point for the shock absorber 11.

As a consequence of this embodiment, the leaf spring 12 has a longitudinal section defining a "Z"-shape, in which the second end 12b is substantially straight and arranged substantially at the same height as the lower plate 21a, the first end 12a is inclined relative to the horizontal until it reaches, in the connection point 14, a greater height than the upper plate 21c and the intermediate portion 12c has an "L"-shaped joining said first and second ends 12a, 12b.

Figure 5:
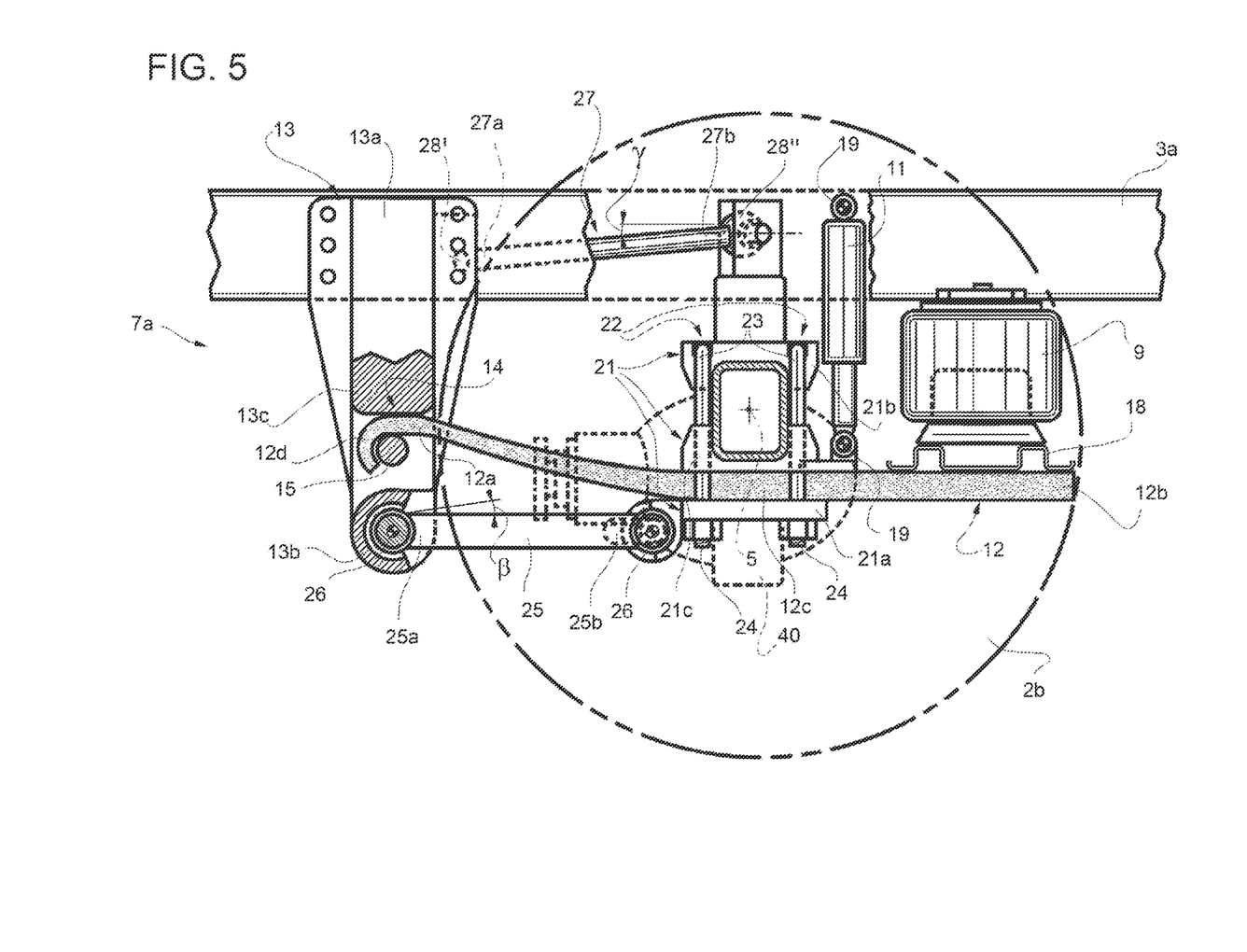
FIG. 5 shows a partially sectional side view of a second embodiment of the suspension of the vehicle of FIG. 2.

According to a second embodiment shown in FIG. 5, the torsion bar 31 is arranged under the axle 5, in particular under the differential 40.

In this configuration, the plates 21a, 21b, 21c are arranged so that the leaf spring 12 is comprised between the lower plate 21a and the intermediate plate 21b and the torsion bar 31 and, consequently, the Stabilinker 25 are fixed to the lower plate 21a. The intermediate plate 21b is placed under the axle 5 and also acts like a hinge point for the shock absorber 11. As a consequence of this embodiment, the spring leaf 12 has a longitudinal section defining a substantially linear shape, like a sliding block, in which the second end 12b is substantially straight and arranged above the lower plate 21a, the first end 12a is inclined relative to the horizontal until it reaches, in the connection point 14, a height that is approximately equal to the one of the intermediate plate 21b and the intermediate portion 12c is linear and joins said first and second ends 12a, 12b.

The suspension system 7 described above works as follows.

When the suspension 7 is being installed, the height of the connections 28" can be adjusted so as to change the inclination angle γ of the V-shaped bars 27. In this way, the suspension 7 can be adjusted to the specific vehicle in order to adjust the anti-squat angle.

After having been mounted with the pre-set inclination angle γ, the suspension 7 couples the axle 5 to the side members 3a, 3b and, hence, to the frame of the vehicle, dampening the relative movements between the two of them.

In particular, substantially vertical movements are countered by the bellows 9, by the shock absorbers 11 and by the leaf spring 12. On the other hand, substantially transverse and/or longitudinal movements between the side members 3a, 3b are countered by the crossbeam 18, by the Stabilinker 25, by the V-shaped bars 27 and by the torsion bar 31.

Owing to the above, the advantages of a suspension system 7 according to the invention are evident.

The suspension system 7 comprises less elements compared to know rear axle suspension systems 7 and, hence, takes up a smaller space ad is less heavy; as a consequence, the suspension system 7 is simpler to be assembly and more economic.

At the same time, the suspension system 7 significantly damps the transmission of loads between the axle 5 and the frame of the vehicle. Furthermore, the suspension system 7 described above ensures a very good driveability of the vehicle.

The aforesaid damping and driveability properties are also obtained thanks to the particular relative arrangement and shape of the elements in the two embodiments described above.

Furthermore, thanks to the fact that the position of the connection 28" can be adjusted during the assembling phase, the same suspension can be used for different types of vehicles, in which the position of the engine and/or the length between the wheels change, with consequent savings and simplifications for the manufacturers of said vehicles.

Finally, the suspension system 7 according to the invention can be subjected to changes and variants, which, though, do not go beyond the scope of protection set forth in the appended claims.

For example, not only the connection 28", but also the connection 28' or one or both connections 26 of the Stabilinker 25 could be adjustable in height.

Furthermore, it is clear that these adjustable connections could also be adjusted in a horizontal direction, so as to change the inclination angle of the respective bar 25, 27.

Moreover, some elements could be left out or have different sections or shapes from the ones described above, though without going beyond their function as claimed hereinafter.

The invention claimed is:

1. A suspension system (7) for a rear axle (5) of a vehicle (1), said vehicle comprising a frame provided with at least two side members (3a, 3b), each of which includes a bracket (13), said suspension system (7) connecting said axle (5) to said side members (3a, 3b) and comprising a left side (7a) and a right side (7b), each comprising an axle-holder assembly (8), a bellows (9), and a leaf spring (12), said leaf spring (12) comprising a first end (12a) connected to one of said side members (3a, 3b), a second end (12b), and an intermediate portion (12c), ranging between said ends (12a, 12b), said bellows (9) being connected to said second end (12b) and to one of said side members (3a, 3b), said axle-holder assembly (8) comprising a plurality of plates (12) interposed between said axle (5) and said leaf spring (12) and retention means (22) configured to keep said plates (21) packed under a compression force with said axle (5) and said leaf spring (12), said left side and said right side (7a, 7b) further comprising a first (25) and a second (27) bar, said first bar (25) comprising a first end connected to the bracket (13) of one of said side members (3a, 3b) at a first connection (26) and a second end connected to said axle-holder assembly (8), said second bar (27) comprising a first portion (27a) connected to the bracket (13) of one of said side members (3a, 3b) at a second connection (28') and a second end (27b) connected to said axle (5) at a third connection (28"), said first and second bars (25, 27) defining respective angles (β, γ) with respect to a horizontal axis, said second bars (27) of said left and right sides (7a, 7b) defining an angle (α), between one another, with respect to a longitudinal axis (A) of said vehicle, said suspension system (7) further comprising a torsion bar (31) directly connected to one of said plates (21) and to said first bars (25), the second connections (28") being spaced apart along the axle (5), wherein at least one of the first connection (26), the second connection (28') and the third connection (28") of said first and second bars (25, 27) is adjustable in height and/or horizontally, in order to vary the respective angle of inclination (β, γ) with respect to the horizontal.

2. The suspension system according to claim 1, further comprising a shock absorber (11) connected to one of said plates (21) and to one of said side members (3a, 3b) by means of respective hinges (19).

3. The suspension system according to claim 1, further comprising a crossbeam (18) interposed between said bellows (9) and the respective end (12b) of said leaf spring (12).

4. The suspension system according to claim 1, wherein a connection (28") between said second bar (27) and said axle (5) is height adjustable.

5. The suspension system according to claim 1, wherein said first bar (25) is a Stabilinker.

6. The suspension system according to claim 1, wherein said first bar (25) is connected to one of said plates (21) and to said torsion bar (31) by means of a hinge.

7. The suspension system according to claim 1, wherein said torsion bar (31) comprises a pair of linear end portions (32) and a central U-shaped portion (33) with the opening facing towards said axle (5).

8. The suspension system according to claim 1, wherein said torsion bar (31) is set above said axle (5).

9. The suspension system according to claim 1, wherein said torsion bar (31) is set below said axle (5).

10. The system according to claim 8, wherein said leaf spring (12) has a longitudinal Z-shaped section, wherein said second end (12b) is straight, said first end (12a) is inclined in respect to the horizontal and is arranged at the same height as a lower plate (21a) of said plates (21) until reaching, at the connection point with said side member (3a, 3b), a height higher than the axle-holder assembly (8) and said intermediate portion (12c) has an L-shape joining said first and second ends (12a, 12b).

11. The system according to claim 1, wherein said second bars (27) are separate bars and are independently adjustable at said axle (5) with the third connections (28") of the second bars (27) being next to one another along the axle (5).

12. The system according to claim 1, wherein said second ends (27b) of the second bars (27) are disposed side-by-side and said second ends (27b) of the second bars (27) being closer to one another than a distance between the first ends (27a) of the second bars (27).

13. The system according to claim 1, wherein each third connection (28") comprises a vertically sliding prism coupling the second end (27b) to the axle (5).

14. A suspension system (7) for a rear axle (5) of a vehicle (1), said vehicle comprising a frame provided with at least two side members (3a, 3b), said suspension system (7) connecting said axle (5) to said side members (3a, 3b) and comprising a left side (7a) and a right side (7b), each comprising an axle-holder assembly (8), a bellows (9), and a leaf spring (12), said leaf spring (12) comprising a first end (12a) connected to one of said side members (3a, 3b), a second end (12b), and an intermediate portion (12c), ranging between said ends (12a, 12b), said bellows (9) being connected to said second end (12b) and to one of said side members (3a, 3b), said axle-holder assembly (8) comprising a plurality of plates (12) interposed between said axle (5) and said leaf spring (12) and retention means (22) configured to keep said plates (21) packed under a compression force with said axle (5) and said leaf spring (12), said left side and said right side (7a, 7b) further comprising a first (25) and a second (27) bar, said first bar (25) comprising a first end connected to one of said side members (3a, 3b) and a second end connected to said axle-holder assembly (8), said second bar (27) comprising a first portion (27a) connected to one of said side members (3a, 3b) and a second end (27b) connected to said axle (5), said first and second bars (25, 27) defining respective angles (β,γ) with respect to a horizontal axis, said second bars (27) of said left and right sides (7a, 7b) defining an angle (a), between one another, with respect to a longitudinal axis (A) of said vehicle, said suspension system (7) further comprising a torsion bar (31) connected to one of said plates (21) and to said first bars (25), wherein said torsion bar (31) is set below said axle (5), wherein said leaf spring (12) has a straight section, wherein said second end (12b) is straight and arranged above a lower plate (21a) of said plates (21), said first end (12a) is inclined in respect to the horizontal until reaching, at the connection point with said side member (3a, 3b), a height approximately equal to the height of an intermediate plate (21b) of said plates (21) and said intermediate portion (12c) is linear and joins said first and second ends (12a, 12b).

15. A vehicle (1) comprising:

a frame provided with at least a pair of side members (3a, 3b) and a rear axle (5); and a suspension system (7) for the rear axle (5) of the vehicle (1), said suspension system (7) connecting said rear axle (5) to said side members (3a, 3b) and comprising a left side (7a) and a right side (7b), each comprising an axle-holder assembly (8), a bellows (9), and a leaf spring (12), said leaf spring (12) comprising a first end (12a) connected to one of said side members (3a, 3b), a second end (12b), and an intermediate portion (12c), ranging between said ends (12a, 12b), said bellows (9) being connected to said second end (12b) and to one of said side members (3a, 3b), said axle-holder assembly (8) comprising a plurality of plates (12) interposed between said axle (5) and said leaf spring (12) and retention means (22) configured to keep said plates (21) packed under a compression force with said axle (5) and said leaf spring (12), said left side and said right side (7a, 7b) further comprising a first (25) and a second (27) bar, said first bar (25) comprising a first end connected to one of said side members (3a, 3b) at a first connection (26) and a second end connected to said axle-holder assembly (8), said second bar (27) comprising a first portion (27a) connected to one of said side members (3a, 3b) at a second connection (28') and a second end (27b) connected to said axle (5) at a third connection (28"), said first and second bars (25, 27) defining respective angles (β,γ) with respect to a horizontal axis, said second bars (27) of said left and right sides (7a, 7b) defining an angle (a), between one another, with respect to a longitudinal axis (A) of said vehicle, said suspension system (7) further comprising a torsion bar (31) directly connected to one of said plates (21) and to said first bars (25), wherein the second bars (27) are arranged such that longitudinal axes of the second bars (27) intersect one another, wherein the second bars (27) are separate discrete bars and the third connections (28") between the second ends (27*b*) of the respective second bars (27) and the axle (5) are at different locations along the axle (5), wherein at least one of the first connection (26), the second connection (28') and the third connection (28") to the respective element is adjustable in height and/or horizontally, in order to vary the respective angle of inclination ($\beta$, $\gamma$) with respect to the horizontal.

\* \* \* \* \*